Patented Mar. 25, 1941

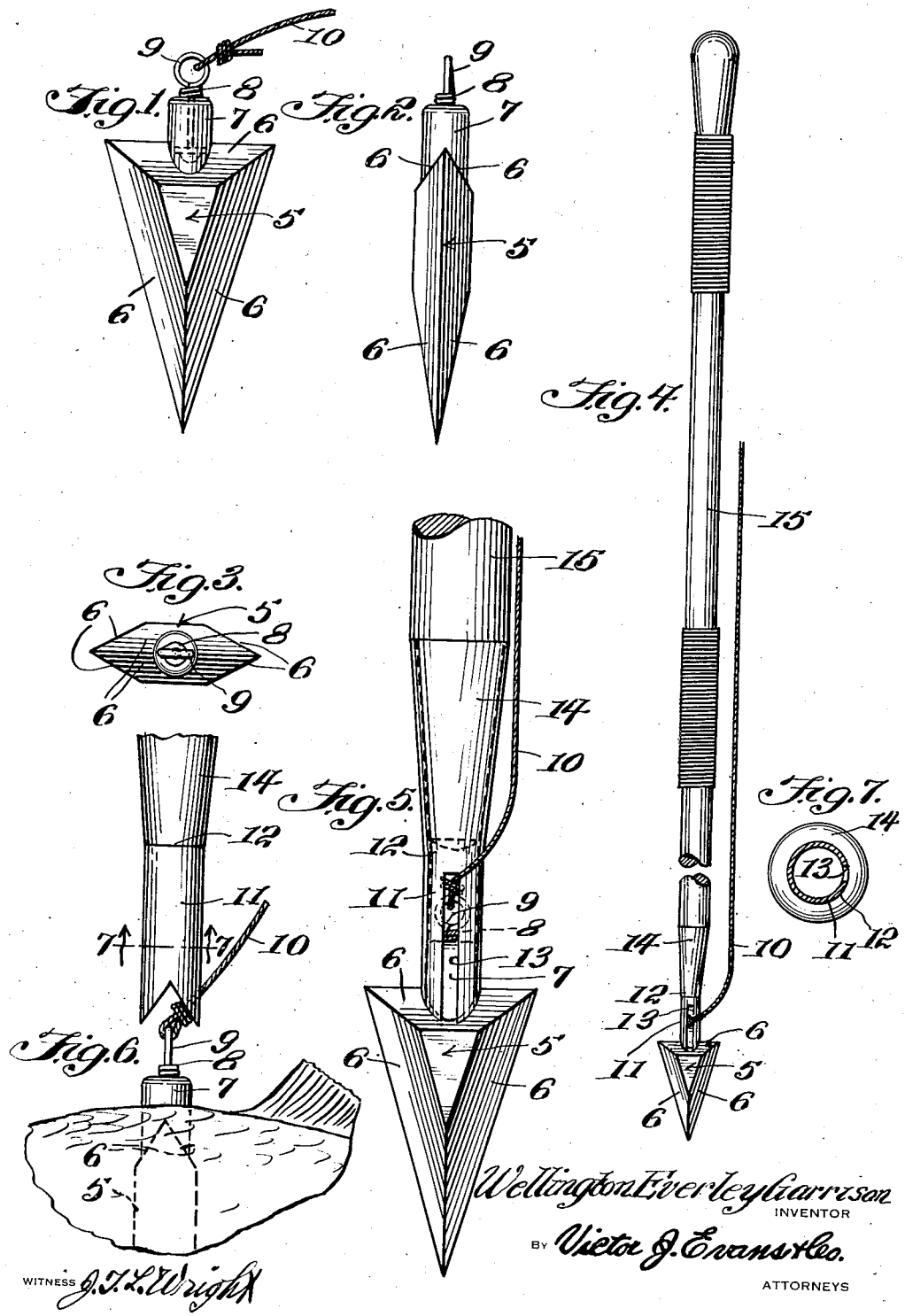

2,236,427

UNITED STATES PATENT OFFICE 2,236,427

FISHING TACKLE

Wellington E. Garrison, Millville, N. J.

Application August 29, 1939, Serial No. 292,483

3 Claims. (Cl. 43—6)

My invention relates to fishing tackle and has as one of the principal objects thereof the provision of a device so constructed and arranged as to be utilized for both a casting sinker and a harpoon spear point.

Another object of my invention is to provide a device of the character described so constructed and arranged that when utilized as a casting sinker it will offer a minimum amount of wind resistance during a casting operation and a minimum amount of noise and splash when entering the water and also preclude snagging engagement with objects in the water.

A further object of my invention is to provide a device of the character described which is simple in construction, durable in use, efficient in operation and economical in manufacture.

Other objects and advantages will be apparent from the following description, appended claims and annexed drawing.

Referring to the drawing wherein like reference characters designate like parts throughout the several views:

Figure 1 is a front elevation of my invention.

Figure 2 is a side elevation thereof.

Figure 3 is a top plan view.

Figure 4 is a front elevation thereof illustrating the same attached to a harpoon handle.

Figure 5 is an enlarged front elevation of my invention in assembled condition with the lower end of a harpoon handle.

Figure 6 is a side elevation of my invention illustrating the same penetrated within a fish and depicting the lower end of the harpoon handle detached therefrom.

Figure 7 is a detail sectional view taken on the line 7—7 of Figure 6.

My novel form of sinker comprises a body 5, preferably constructed of lead or the like and which is of an elongated arrow-head configuration in side elevation. The body is relatively thick and flat adjacent its upper mid portion when disposed in a vertical position and the point subjacent the body.

The oppositely disposed outer edge faces 6 of the body are inwardly and outwardly tapered and define an isosceles triangular configuration in section to provide a continuous knife edge about said body. The upper or triangular base end of the body has fashioned thereon a stud 7 in which is swivelled the inner end of a swivel member 8, the outer end of which is fashioned with an eye 9 to which is attached the end of a line or cable 10.

From the foregoing it will be apparent that when the device is utilized as a casting sinker the edges 6 will create a minimum amount of wind resistance during the casting operation and a minimum amount of noise and splash when entering the water and also operate to preclude snagging engagement with objects within the water.

When utilized as a harpoon point, the stud 7 is positioned within the lower end 11 of a sleeve 12 and frictionally held therein, said lower end being fashioned with a slot 13 through which the cable 10 extends. The upper or opposite end 14 of the sleeve 12 is outwardly tapered and forms a tapered socket in which is arranged the lower end of a harpoon handle 15.

The lower end of the harpoon handle 15 is tapered in accordance with the taper of the upper end 14 of the sleeve 12 whereby to preclude the end engaging the eye 9 of the swivel member 8. When the device is thus utilized as a harpoon point, it is thrown together with the handle for harpooning a fish or the like and when said fish is harpooned, the handle including the sleeve may be removed from the shank leaving the body 5 buried within the fish and having attached thereto the cable 10 for maintaining the fish captive.

It is obvious that the invention is not confined to the herein described use therefor as it may be utilized for any purpose to which it is adaptable. It is therefore to be understood that the invention is not limited to the specific construction as illustrated and described, as the same is only illustrative of the principles of operation which are capable of extended application in advance forms, and that the invention comprehends all construction within the scope of the appended claims.

What I claim is:

1. A device of the character descried, comprising an elongated handle having a sleeve secured to one end thereof and provided with an elongated slot in one side thereof, an arrow-head lead having a reduced portion frictionally held in the sleeve, and an eye carried by the upper end of the reduced portion of the arrow-head lead and having a line secured thereto extending outwardly through the slot.

2. A device of the character described, comprising an elongated handle, a sleeve secured to one end thereof and extending beyond the same and having a slot in one side, an arrow-head lead having a reduced portion frictionally held in the sleeve, a swiveled eye carried by the upper end of the reduced portion of the arrow-head lead, and a line secured to said swiveled eye and extending outwardly through the slot in the sleeve.

3. A device of the character described, comprising an elongated handle, a sleeve secured to one end thereof and extending beyond the same and having a slot in one side, oppositely arranged V-shaped slots in the lower end of the sleeve, an arrow-head lead having a V-shaped upper end and a reduced central portion frictionally held in the sleeve, an eye carried by the upper end of the reduced portion of the arrow-head lead, and a line secured to said eye and extending outwardly through the slot in the sleeve.

WELLINGTON E. GARRISON.